United States Patent [19]

Mäder

[11] Patent Number: 4,977,362
[45] Date of Patent: Dec. 11, 1990

[54] PROTECTION METHOD AND PROTECTION DEVICE FOR DETECTING ASYNCHRONISM IN THE SYNCHRONOUS STARTING OF A SYNCHRONOUS MACHINE

[75] Inventor: Rudolf Mäder, Zurich, Switzerland

[73] Assignee: Asea Brown Boveri Ltd., Baden, Switzerland

[21] Appl. No.: 409,754

[22] Filed: Sep. 20, 1989

[30] Foreign Application Priority Data

Sep. 27, 1988 [CH] Switzerland ............... 3582/88

[51] Int. Cl.$^5$ ............................................. H02P 5/40
[52] U.S. Cl. .................................. 318/713; 318/712; 318/700; 318/798
[58] Field of Search ............... 318/700, 706, 707, 710, 318/712, 713, 714, 723, 732, 786, 798, 803, 807, 808, 703, 819, 812; 361/23

[56] References Cited

U.S. PATENT DOCUMENTS

| | | | |
|---|---|---|---|
| 3,748,555 | 7/1973 | Hoffman | 318/718 |
| 3,784,896 | 1/1974 | Lakota . | |
| 3,793,572 | 2/1974 | Canay | 318/718 |
| 4,366,427 | 12/1982 | Walker et al. | 318/798 |
| 4,572,995 | 2/1986 | Enami | 318/606 |
| 4,616,166 | 10/1986 | Cooper et al. | 318/712 |
| 4,659,973 | 4/1987 | Stich | 318/718 |
| 4,812,729 | 3/1989 | Ito et al. | 318/806 |

FOREIGN PATENT DOCUMENTS 3742555 7/1988 Fed. Rep. of Germany .

OTHER PUBLICATIONS

"Frequenzanlauf fur Pumpspeicherwerke—Moglichkeiten und Optimierung", Bose, Canay and Simond, 7/8–83.

Primary Examiner—William M. Shoop, Jr.
Assistant Examiner—John W. Cabeca
Attorney, Agent, or Firm—Burns, Doane, Swecker & Mathis

[57] ABSTRACT

During the run-up of high-power synchronous machines (6), such as those used in pumped storage plants, in gas turbines sets and so forth, unwanted alternating currents with slip frequencies between those of the phase swings and the nominal frequency (50 Hz) of the synchronous machine (6) can also occur in the disturbed condition in addition to low-frequency plant-specific phase swings. These alternating currents are induced in the field windings of the synchronous machine (6) as a consequence of an unwanted asynchronous starting and can lead to inadmissible heating of the synchronous machine and to overvoltages in the field circuit. Alternating voltages (U1) associated with the slip frequencies are detected from use of a sensing resistor (4) in the exciter current ($i_f$) of the synchronous machine (6), separated from the high-voltage potential in an isolating converter (10), subsequently filtered in a bandpass filter (11), controlled for constant amplitude in a function generator (12), triggered in a Schmitt trigger (13) and selected by means of two timing sections (15, 16). If a slip frequency is detected uninterrupted for longer than a predeterminable minimum period (T3), field and high-voltage switches (5, 7) in the circuits of the synchronous machine (6) are opened by a RS flip-flop (19).

10 Claims, 1 Drawing Sheet

PROTECTION METHOD AND PROTECTION DEVICE FOR DETECTING ASYNCHRONISM IN THE SYNCHRONOUS STARTING OF A SYNCHRONOUS MACHINE

BACKGROUND OF THE INVENTION

1. Field of the Invention

The invention is based on a protection method and on a protection device for detecting asynchronism during the synchronous starting of synchronous machines.

2. Background of the Invention

The present invention relates to a prior art system which is known from the Swiss house journal: Brown Review 7/8 (1983), pages 295–302. In this journal, various starting methods, selected and optimized depending on power system conditions, are specified for synchronous machines which are operated both as generators and as motors, such as pumped storage plants and gas turbine sets. During so-called fully synchronous starting, the two electrically connected salient-pole machines are already excited by static exciter devices when they are standing still. The mechanically driven generator initially supplies the motor with a stator current with a very low frequency which generates an electromagnetic torque in the motor. The motor becomes synchronized with the generator under certain specified conditions which have already been successfully used with a ratio of machine powers of 1:20. In this arrangement, the stators of both machines are electrically connected, if necessary, over long distances and with the interposition of several transformers if required. In so-called partially synchronous starting, the motor initially starts asynchronously. Excitation only occurs after the generator speed has been reached after and which the motor is synchronously run up to speed.

However, protective measure is specified for the case where the field current is too low or the turbine controller runs up the generator too fast so that the motor cannot follow. During synchronous run-up of the motor, loss of synchronism, i.e. too much slip, can occur which in turn can lead to inadmissibly high heating of the heavy-current parts of the motor and to overvoltages in the field circuit. It is therefore desirous to prevent these occurrences.

SUMMARY OF THE INVENTION

The present invention achieves the object of unambiguously distinguishing during the run-up of a synchronous machine between its synchronous, i.e. undisturbed, condition and its asynchronous, i.e. disturbed, condition, and in the case of the disturbed condition to initiate a protective measure for the synchronous machine.

An advantage of the present invention lies in the fact that the inadmissible asynchronous condition is detected reliably and in time, and as a result of which premature aging of the winding insulation due to heating and damage to the static converter due overvoltage are avoided. A further advantage involves the fact that the measurement only needs to be taken at the location of the motor-driven synchronous machine, as a result of which there is no expensive and unreliable remote measuring. In addition, the protection device according to the present invention allows a selective error detection by relatively simple means in that phase swinging and switch-on oscillations and power system frequency interference reliably do not lead to the protection device responding.

BRIEF DESCRIPTION OF THE DRAWINGS

A more complete appreciation of the invention and many present advantages thereof will be readily obtained as the same becomes better understood by reference to the following detailed description when considered in connection with the accompanying drawings, wherein.

DESCRIPTION OF THE PREFERRED EMBODIMENTS

Figure 1:
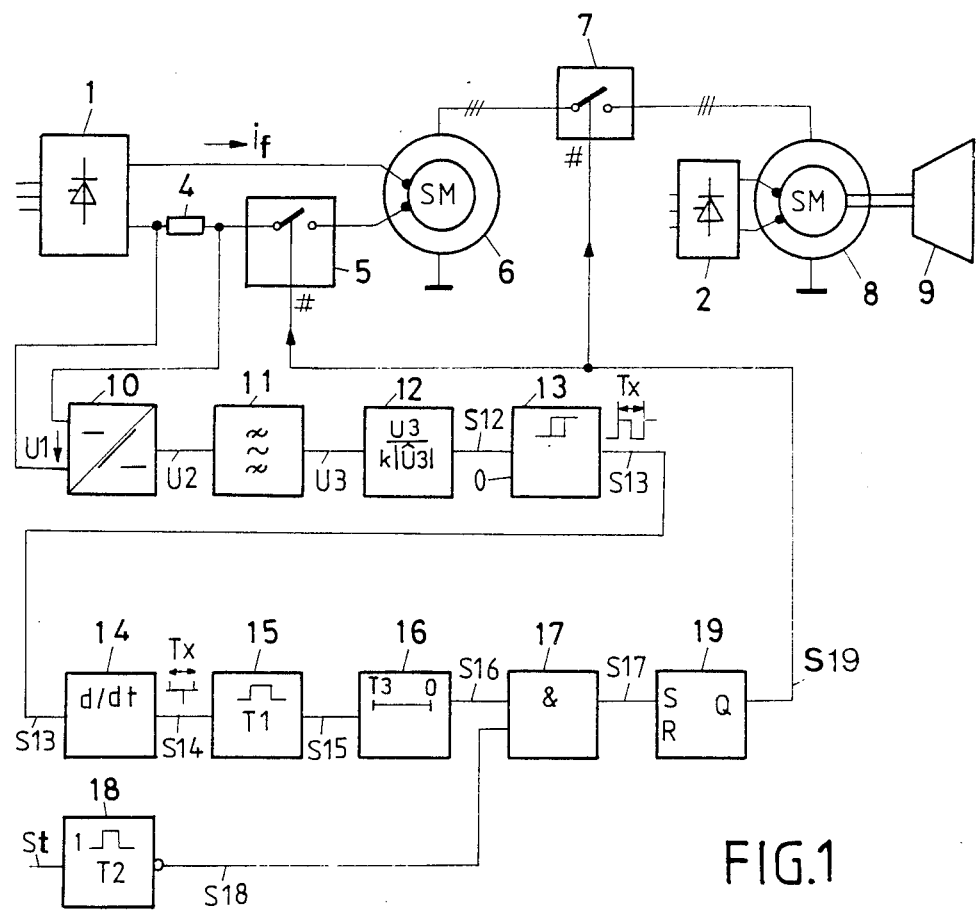
FIG. 1 illustrates a circuit diagram of a generator with turbine during the synchronous, starting of a synchronous machine with an exciter device and an associated protection device.

Referring now to the drawings, wherein like reference numerals designate identical or corresponding parts throughout the several views, in FIG. 1, numeral 1 designates a direct-current source or a direct-current controller or exciter converter which feeds the field winding of a synchronous machine 6, here operated as motor, preferably of the salient-pole type of construction, with an exciter current $i_f$. A field switch 5 and a sensing resistor 4 for the exciter current $i_f$ is located in the exciter circuit.

The stator of the synchronous machine 6 is electrically connected via a second switch or high-voltage switch 7 to the stator of a synchronous machine (generator) 8 which is also constructed as a salient-pole machine. The rotor of synchronous machine 8 is mechanically drive-coupled to a turbine 9 and is fed by an exciter converter 2.

Across the sensing resistor 4, a sensing voltage U1 proportional to the exciter current $i_f$ is picked up and supplied to a direct-voltage converter or isolating converter 10. The output of the isolating converter 10 supplies a reference-potential-free voltage signal U2 which is proportional to the field or exciter current $i_f$. This voltage signal U2 is subsequently filtered in a frequency or bandpass filter 11 having the cutoff frequencies of 2.5 Hz and 50 Hz, respectively. Thus, the direct-current component oscillation frequencies up to 2.5 and any higher-frequency interference voltage (>50 Hz) are filtered out of the voltage signal U2. An alternating-voltage signal which is then present in a filter output signal U3 of the bandpass filter 11 varies from about 2.5 Hz to 50 Hz and is proportional to the slip frequency. A separation between phase swings and induction-related oscillations due to asynchronous run-up is already achieved by the filtering in the bandpass filter 11.

The filter output signal U3 is subsequently brought to a constant amplitude in a function generator 12 which will be described in greater detail in connection with FIG. 2, in that the frequency output signal U3 itself is divided by the amount of the maximum signal amplitude $|\hat{u}3|$. A small offset voltage at the input of an operational amplifier used for the division ensures that the division is not by 0 with a missing filter output signal U3. The constant K refers to a predeterminable factor which is preferably selected to be equal to 1.

A sinusoidal output signal S12 from the output of the function generator 12 is converted into a rectangular voltage of the same frequency or a rectangular voltage signal S13 by means of a threshold detector or Schmitt trigger 13 having a threshold of 0.

The rectangular voltage signal S13 is supplied via a differentiating section 14 to a retriggerable monostable flip-flop 15. An output signal S14 of the differential section 14 alternately exhibits positive and negative pulses, the spacing of which is equal to the duration of the period Tx of the alternating-voltage signal to be checked.

The flip-flop 15 has a predeterminable release time T1 within a range of 0.1s–0.5s (corresponding to 10 Hz to 2 Hz), preferably of 0.4s. At the output, the flip-flop 15 is connected via a timing section or delay section 16 to a first input of an AND gate 17. The delay section 16 has a predeterminable switching delay within a range of 2s to 5s, preferably of T3=3s, for the transition from the internal 0 state to the internal 1 state at the output with respect to the same transition at the input. The transition from the internal 1 state to the internal 0 state at the output occurs without delay with respect to the same transition at the input. In this manner, output signals S15=1 which are shorter than the switching delay or minimum period T3 do not generate any error signal S16=1 at the output of the delay section 16.

A blocking time section or a non-retriggerable monostable flip-flop 18 with a negated output generates, in dependence on a start signal St for the synchronization of the synchronous machine 6, which can be predetermined manually or via a higher-level controlling device, not shown, a blocking signal S18=0 at the output during a predeterminable blocking time T2 within a range of 1s–10s preferably of 5s. The blocking signal S18 is supplies to a second input of the AND gate 17 and keeps the output signal S17 at logical 0 during the blocking time T2. During the remaining time, S18=1, the AND gate 17 is thus enabled so that an output signal S16=1 at the output of the delay section 16 can pass through AND gate 17 and can generate a signal S17=1 at the output.

Instead of the flip-flop 18, a timing relay can also be used in order to gate out transient events occurring at the beginning of the start-up of the synchronous machine 6 and to prevent an unwarranted responding of the protection device or an opening of the switches 5 and 7 which are closed during the synchronous starting.

On the output side, the AND gate 17 is connected to the set or S input of an RS flip-flop 19. The output of the RS flip-flop 19 is connected to the control inputs of the switches 5 and 7 which open with S19=1 and interrupt the respective switching path so that the synchronous machine 6 is electrically disconnected.

After an elimination of the disturbance, the switches 5 and 7 can be closed again by the reset signal from a higher-level automatic power station sequence control system to the reset or R input of the RS flip-flop 19.

The spacing of the positive pulses of the signal S14 is the period Tx of the alternating-voltage signal which must be investigated for a fault condition in the synchronous starting of the synchronous machine 6. The positive pulses of S14 control the flip-flop 15, the release time T1 of which is set to be slightly shorter than the period of the highest plant-specific phase swing. These plant-specific phase swing frequencies are between 0.7 Hz and 1.5 Hz.

Under these conditions, the flip-flop 15 only outputs a continuous signal if the frequency of the alternating voltage detected is higher than the plant-specific phase swing frequency and is thus reliably a consequence of asynchronous operation. If the signal S15=1 is present for a longer period than the predeterminable minimum period T3 and if the AND gate 17 is not at the same time disabled by the start signal St because of a transient event, an output signal S18=1 appears at the output of the AND gate 17 which is stored in the subsequent RS flip-flop 19, the output signal S19 of which becomes =1.

Figure 2:
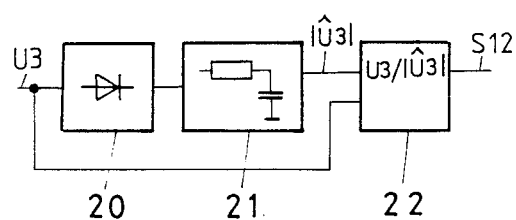
FIG. 2 illustrates a circuit of a function generator for the protection device according to FIG. 1.

FIG. 2 shows an illustrative embodiment of the function generator 12 according to FIG. 1. The numeral 20 designates a rectifier, the input of which is supplied with the filter output signal U3, and the output of which is connected via an RC low-pass filter 21 to a dividing section 22 which divides the current amplitude of the input signal U3 by the positive maximum value $|\hat{u}3|$ of the amplitude of this alternating-voltage signal. The alternating-voltage signal U3 to be checked is thus controlled for constant amplitude.

It is important that slip or alternating-current components in the exciter current $i_f$ of the synchronous machine 6 which are due to asynchronous running and which are above plant-specific phase swing frequencies of about 1.5 Hz are reliably detected and used for initiating a protective measure if they last longer than a predeterminable minimum period T3. Slower alternating voltage components should not lead to a disconnection of the synchronous machine. The slip frequency of the alternating current component to be checked is not directly measured. Instead, it is checked whether the slip period corresponding to the slip frequency wanted is within a predeterminable period interval.

The protection device according to the invention can also be used when a synchronous machine is started in phase-shifting mode, and with synchronous run-up of the two shaft assemblies of cross-coupled steam turbine sets.

Naturally, instead of detecting a period, the frequency of the slip-relating alternating voltages can be detected by means of an evaluation which is analogous to the evaluation of periods.

For each of the two machines 6 and 8, a field switch 5 and a high-voltage switch 7 close to the machine can be provided. A fault condition can be stored in the switches which renders the RS flip-flop 19 unnecessary.

Obviously, numerous modifications and variations of the present invention are possible in light of the above teachings. It is therefore to be understood that within the scope of the appended claims, the invention may be practised otherwise than as specifically described herein.

What is claimed as new and desired to be secured by Letters Patent of the United States is:

1. A protection method for detecting asynchronism in synchronous starting of a synchronous machine, in which the synchronous machine, with predeterminable nominal frequency and plant-specific oscillation frequencies caused by phase swings obtains its field or exciter current from an exciter converter, wherein said exciter current is monitored selectively for the presence of slip frequencies within a frequency range between 2.5 Hz and said nominal frequency, wherein oscillation frequencies less than 2.5 Hz are eliminated, and at least said exciter current of said synchronous machine is interrupted or switches off, if at least one of said slip frequencies appears in said frequency range between 2.5 Hz and said nominal frequency longer than a predeterminable period of time in a range from 2 seconds to 5 seconds during which no unacceptably high heating of said synchronous machine occurs, and since the starting of said synchronous machine a predeterminable transient time has passed, said transient time being in a range from 1 second to 10 seconds.

2. A protection device for detecting asynchronism in the synchronous starting of a synchronous machine which is effectively connected via an exciter circuit to an exciter converter from which the synchronous machine obtains an exciter current, comprising:
a field switch within said exciter circuit of said synchronous machine, and
a frequency detection device for detecting at least one alternating-current component of said exciter current coupled to said exciter circuit, said frequency detection device being suitable for detecting slip frequencies which are higher than plant-specific oscillation frequencies and lower than a nominal frequency of said synchronous machine, said nominal frequency being 50 Hz; wherein
an output of said frequency detection device being coupled to a first timing unit with a predeterminable release time which is shorter than the period of a highest oscillation frequency,
an output of said first timing unit being coupled to a second timing unit having a predeterminable switching delay for a transition from an internal 0 state to an internal 1 state, in such a manner that an output of said second timing unit only assumes a 1 state if its input signal is uninterruptibly present at least during the period of said predeterminable switching delay, and
said output of said second timing unit is connected to control at least said field switch within said exciter circuit, in such a manner that said field switch opens when said second timing unit assumes its 1 state at its output.

3. A protection device as claimed in claim 2, wherein said frequency detection device includes a bandpass filter which blocks frequencies which are lower than or equal to oscillation frequencies specific for said synchronous machine and which are greater than or equal to said nominal frequency which is specific for said synchronous machine.

4. A protection device as claimed in claim 3, wherein said frequency detection device includes a threshold detector having an input coupled to an output of said frequency filter or bandpass filter, and having an output which supplies a 1 signal when its input signal exceeds a predeterminable threshold, in particular, said threshold detector is a 0 detector having a threshold of 0.

5. A protection device as claimed in claim 4, wherein said input of said threshold detector being coupled via a function generator to said output of said frequency filter or bandpass filter, an output of said function generator supplying a signal which is proportional to the slip frequency, particularly, said function generator forms the function:

$$U3/k.|\hat{u}3|),$$

where U3 is its input signal $|\hat{u}3|$ is the amount of the maximum signal amplitude of U3 and k is a predeterminable factor.

6. A protection device as claimed in claim 2, wherein a blocking time unit is provided which supplies, in dependence on a predeterminable start signal during a predeterminable blocking time, a blocking signal at its output which prevents the opening of at least one field switch during said predeterminable blocking time duration, said blocking time being a settling time during the starting of said synchronous machine and being within a range of 1 second to 10 seconds.

7. A protection device as claimed in claim 6, wherein said blocking time unit is a monostable flip-flop, which acts as a timing relay, and has an output which is connected via a logic AND gate to control the at least one field switch, an input of said logic AND gate also being coupled to said output of said blocking time unit.

8. A protection device as claimed in claim 2, wherein said threshold detector is followed by a differentiating section, an output of which is effectively connected to said first timing unit.

9. A protection device as claimed in claim 2, wherein said release time of said first timing unit is within a range of from 0.1 seconds to 0.5 seconds and said delay of said second timing unit is within a range of from 2 seconds to 5 seconds.

10. A protection device as claimed in claim 2, wherein said alternating-current component induced in said exciter current of said synchronous machine is detected by an isolating converter, said stator of the synchronous machine is electrically fed by a generator via at least one high-voltage switch, and said output of said second timing unit is connected to control a field switch and a high-voltage switch in said synchronous machine, said second timing unit being connected to control said switches via an RS flip-flop.

* * * * *